US012506397B2

(12) United States Patent
Chan

(10) Patent No.: US 12,506,397 B2
(45) Date of Patent: Dec. 23, 2025

(54) POWER SUPPLY HAVING ADAPTIVE ADJUSTABLE FREQUENCY RANGE OF VOLTAGE COMPENSATION MECHANISM

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 196 days.

(21) Appl. No.: 18/415,691

(22) Filed: Jan. 18, 2024

(65) Prior Publication Data
US 2025/0079968 A1    Mar. 6, 2025

(30) Foreign Application Priority Data
Sep. 5, 2023   (TW) .................................. 112133669

(51) Int. Cl.
*H02M 1/00*    (2007.01)
*H02M 1/42*    (2007.01)
(Continued)

(52) U.S. Cl.
CPC ....... *H02M 1/0025* (2021.05); *H02M 1/0035* (2021.05); *H02M 1/4225* (2013.01);
(Continued)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 11,705,821 B2 * 7/2023 Liu ..................... H02M 3/158
363/21.12
11,894,779 B2 * 2/2024 Prasantanakorn .... H02M 7/217
(Continued)

FOREIGN PATENT DOCUMENTS

CN    105048814 A    11/2015
CN    216056831 U    3/2022

OTHER PUBLICATIONS

NXP AN10782 GreenChip III TEA1750: integrated PFC and flyback controller NXP Feb. 10, 2009 pp. 1-27. ,Feb. 10, 2009.

*Primary Examiner* — Jeffrey A Gblende
(74) *Attorney, Agent, or Firm* — Winston Hsu

(57) ABSTRACT

A power supply includes a noise suppression circuit, an active power factor correction circuit, an active clamp flyback conversion circuit, a voltage-stabilizing feedback compensation circuit, and a control circuit. The active power factor correction circuit and the active clamp flyback conversion circuit convert an AC voltage into an output voltage for driving a load. The voltage-stabilizing feedback compensation circuit performs voltage-stabilizing feedback compensation to the output voltage. The active clamp flyback conversion circuit switches its operational mode based on the instantaneous output loading of the power supply. The control circuit controls the operation of the voltage-stabilizing feedback compensation circuit based on the operational mode of the active clamp flyback conversion circuit, thereby adjusting the equivalent capacitance of the voltage-stabilizing feedback compensation circuit for providing a corresponding voltage-stabilizing feedback compensation range associated with the instantaneous output loading of the power supply.

14 Claims, 6 Drawing Sheets

(51) Int. Cl.
  *H02M 1/44* (2007.01)
  *H02M 3/00* (2006.01)
  *H02M 3/335* (2006.01)

(52) U.S. Cl.
  CPC ............... *H02M 1/44* (2013.01); *H02M 3/01* (2021.05); *H02M 3/33523* (2013.01)

(58) Field of Classification Search
  CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
  See application file for complete search history.

(56) References Cited

U.S. PATENT DOCUMENTS

| | | | |
|---|---|---|---|
| 2015/0079901 A1 | 3/2015 | Schie | |
| 2021/0399643 A1* | 12/2021 | Oh | ..................... H02M 1/4258 |
| 2023/0092299 A1* | 3/2023 | Chien | ............... H02M 3/33507 |
| | | | 363/13 |

* cited by examiner

POWER SUPPLY HAVING ADAPTIVE ADJUSTABLE FREQUENCY RANGE OF VOLTAGE COMPENSATION MECHANISM

BACKGROUND OF THE INVENTION

1. Field of the Invention

The present invention is related to a power supply, and more particularly, to a power supply having adaptive adjustable frequency range of voltage compensation mechanism.

2. Description of the Prior Art

Power supply circuits are commonly used to convert alternative-current (AC) power into direct-current (DC) voltages for driving various components in a computer system which may have different operating voltages. The unlimited extraction of natural resources and the consequences of overlooking the environmental costs of such behavior have made more and more people aware of the importance of eco-design measures. Many frameworks have been established for the setting of eco-design requirements for energy-using products, such as consumer electronics, office equipment, household appliances, or power supplies. For example, Energy Star is a program run by the U.S. Environmental Protection Agency (EPA) and U.S. Department of Energy (DOE) that promotes energy efficiency. The program provides information on the energy consumption of products and devices using different standardized methods.

For a power supply and its related system design, its rated power factor is required to be larger than 0.9 according to Energy Star standard. Therefore, a high-power power supply typically includes a boost front-end circuit and a buck back-end circuit. The boost front-end circuit of the high-power power supply may be a boost power factor correction (PFC) circuit capable of improving the power factor of the AC voltage. The buck back-end circuit of the high-power power supply may be a step-down flyback converter capable of converting a high voltage (such as 400V) outputted by the boost active PFC circuit into a low voltage (such as 19.5V) for supplying the operation of a load device (such as a laptop computer).

In order to meet the requirement of stricter power-saving specification, a power supply usually adopts a voltage-stabilizing feedback compensation mechanism for reducing power consumption. However, the prior art power supply only adopts a single frequency range of voltage compensation based on its maximum loading rate, and is thus unable to achieve optimized power reduction when operating in different modes. Therefore, there is a need for a power supply having adaptive adjustable frequency range of voltage compensation.

SUMMARY OF THE INVENTION

The present invention provides a power supply with an adaptive adjustable frequency range of voltage compensation mechanism and configured to convert an AC voltage into an output voltage for supplying power to a loading device. The power supply includes a noise suppression circuit, a boost active PFC circuit, an active clamp flyback converting circuit, a voltage-stabilizing feedback compensation circuit and a control circuit. The noise suppression circuit is configured to filter noises in the AC voltage for providing a processed AC voltage. The boost active PFC circuit is configured to convert the processed AC voltage into a DC voltage and then convert the DC voltage into a first pulse DC voltage. The active clamp flyback converting circuit is configured to convert the first pulse DC voltage into the output voltage and provide a detecting voltage associated with the output voltage. The voltage-stabilizing feedback compensation circuit is configured to perform voltage stabilization to the output voltage selectively using a first voltage-stabilizing feedback compensation range or a second voltage-stabilizing feedback compensation range. The control circuit is configured to output a first control signal for controlling an operation of the boost active PFC circuit, wherein a voltage level of the first control signal periodically switches between a first enable level and a first disable level; output a second control signal for controlling an operation of the active clamp flyback converting circuit, wherein a voltage level of the second control signal periodically switches between a second enable level and a second disable level; determine a current operational mode of the active clamp flyback converting circuit based on the detecting voltage; control the voltage-stabilizing feedback compensation circuit to perform voltage-stabilizing feedback compensation to the output voltage using the first voltage-stabilizing feedback compensation range when it is determined based on the detecting voltage that the active clamp flyback converting circuit is operating in a first mode; and control the voltage-stabilizing feedback compensation circuit to perform voltage-stabilizing feedback compensation to the output voltage using the second voltage-stabilizing feedback compensation range when it is determined based on the detecting voltage that the active clamp flyback converting circuit is operating in a second mode. A first instantaneous output loading of the power supply when the active clamp flyback converting circuit is operating in the first mode is larger than a second instantaneous output loading of the power supply when the active clamp flyback converting circuit is operating in the second mode. The first voltage-stabilizing feedback compensation range is larger than the second voltage-stabilizing feedback compensation range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
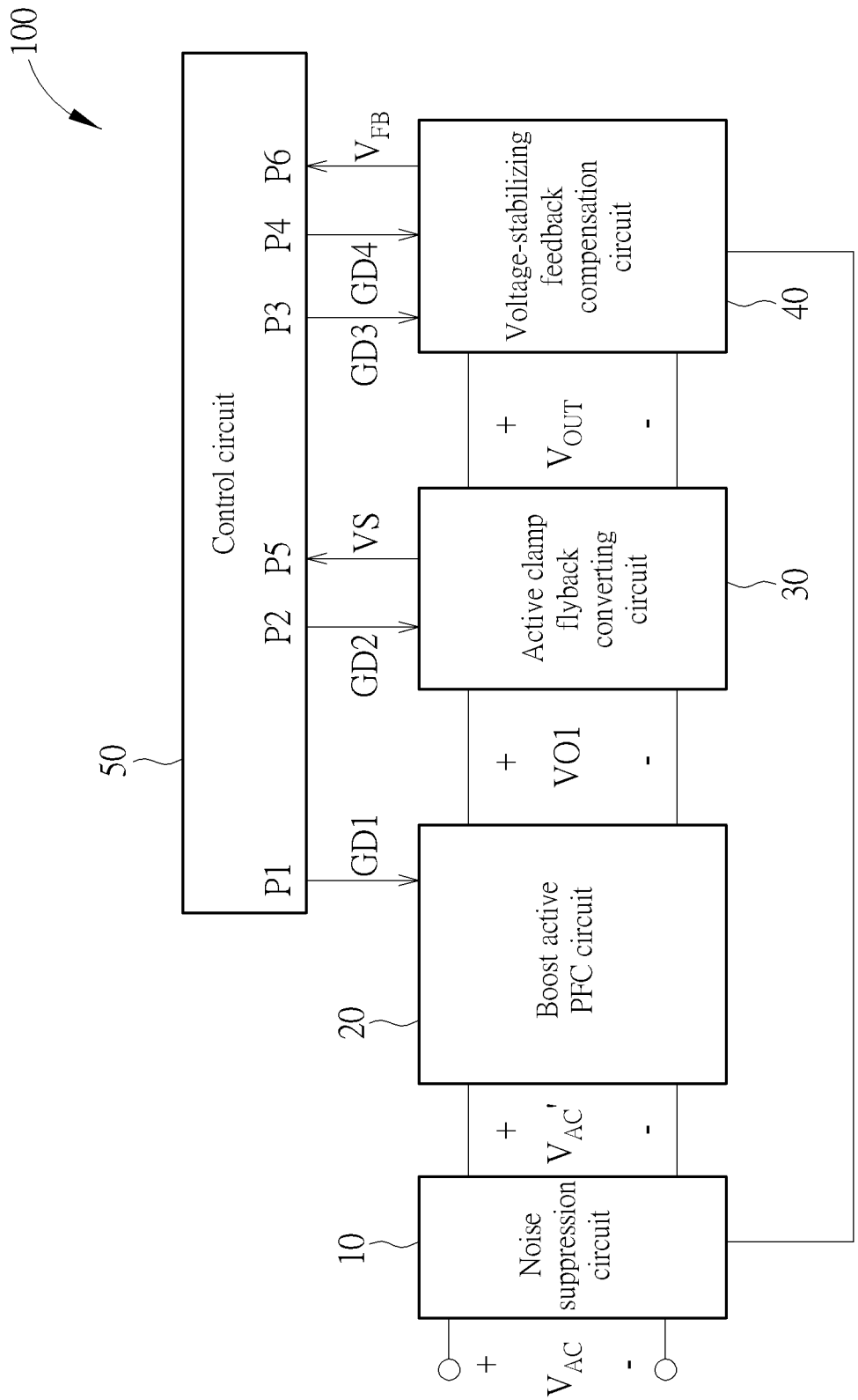
FIG. 1 is a functional diagram illustrating a power supply with an adaptive adjustable frequency range of voltage compensation mechanism according to an embodiment of the present invention.

FIG. 1 is a functional diagram illustrating a power supply 100 with an adaptive adjustable frequency range of voltage compensation mechanism according to an embodiment of the present invention. The power supply 100 includes a noise suppression circuit 10, a boost active power factor correction (PFC) circuit 20, an active clamp flyback converting circuit 30, a voltage-stabilizing feedback compensation circuit 40, and a control circuit 50. The noise suppression circuit 10 is configured to receive an AC voltage $V_{AC}$ provided by AC mains and filter differential-mode/common-mode noises in the AC voltage $V_{AC}$, thereby providing a corresponding processed AC voltage $V_{AC}'$. The boost active PFC circuit 20 is configured to convert the processed AC voltage $V_{AC}'$ into a pulse DC voltage VO1. The active clamp flyback converting circuit 30 is configured to convert the pulse DC voltage VO1 into an output voltage $V_{OUT}$ for supplying power to a loading device (not shown in FIG. 1) and provide a detecting voltage VS associated with the status of the output voltage $V_{OUT}$. The voltage-stabilizing feedback compensation circuit 40 is configured to monitor the status of the output voltage $V_{OUT}$ for providing a corresponding feedback voltage $V_{FB}$, and perform voltage-stabilizing feedback compensation to the output voltage $V_{OUT}$ according to the operational mode of the active clamp flyback converting circuit 30. The control circuit 50 is configured to control the operations of the boost active PFC circuit 20, the active clamp flyback converting circuit 30 and the voltage-stabilizing feedback compensation circuit 40 according to the feedback voltage $V_{FB}$ and the detecting voltage VS in order to perform voltage conversion and voltage-stabilizing feedback compensation, and adaptively adjust the frequency range of voltage-stabilizing feedback compensation according to the operational mode of the active clamp flyback converting circuit 30 in order to reduce power consumption.

Figure 2:
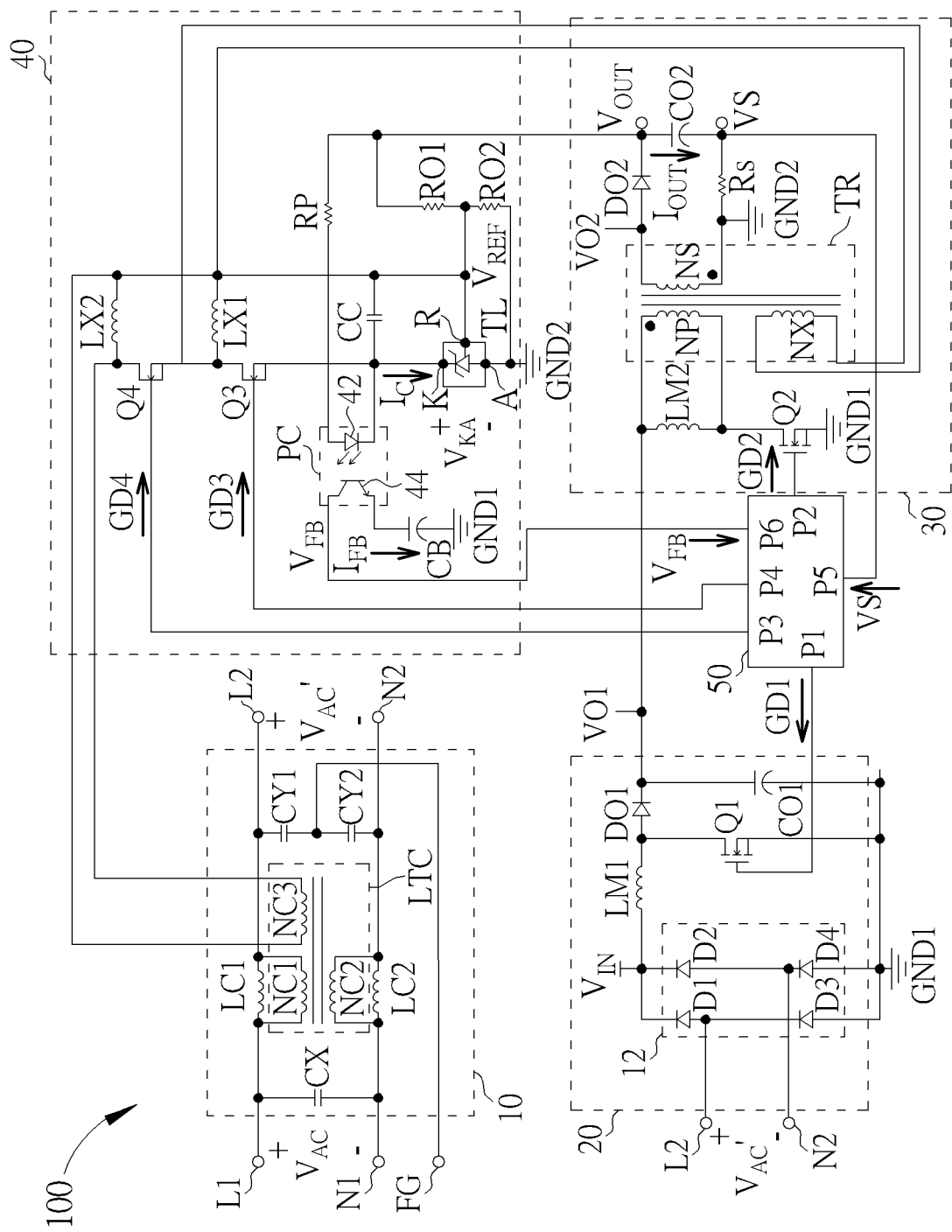
FIG. 2 is a diagram illustrating an implementation of the power supply according to an embodiment of the present invention.

FIG. 2 is a diagram illustrating an implementation of the power supply 100 according to an embodiment of the present invention. The noise suppression circuit 10 may be coupled to AC mains via a live pin L1 and a neutral pin N1 for receiving the AC voltage $V_{AC}$, and output the processed AC voltage $V_{AC}'$ via a live pin L2 and a neutral pin N2. However, the implementation of the transmission interface between the noise suppression circuit 10 and AC mains does not limit the scope of the present invention.

In the embodiment depicted in FIG. 2, the noise suppression circuit 10 includes common-mode inductors LC1-LC2, a coupling inductor LTC, an X-capacitor CX and Y-capacitors CY1 and CY2. The coupling inductor LTC includes three windings (represented by respective numbers of turns NC1-NC3), wherein the windings NC1 and NC3 are disposed on the first side of the coupling inductor LTC and the winding NC2 is disposed on the second side of the coupling inductor LTC. In the coupling inductor LTC, the first terminal of the winding NC1 is coupled to the first input end of the noise suppression circuit 10 (i.e., the live pin L1), and the second terminal of the winding NC1 is coupled to the first output end of the noise suppression circuit 10 (i.e., the live pin L2). The first terminal of the winding NC2 is coupled to the second input end of the noise suppression circuit 10 (i.e., the neutral pin N1), and the second terminal of the winding NC2 is coupled to the second output end of the noise suppression circuit 10 (i.e., the neutral pin N2). The first terminal and the second terminal of the winding NC3 are coupled to the voltage-stabilizing feedback compensation circuit 40. The first end of the common-mode inductor LC1 is coupled to the first terminal of the winding NC1 in the coupling inductor LTC, and the second end of the common-mode inductor LC1 is coupled to the second terminal of the winding NC1 in the coupling inductor LTC. The first end of the common-mode inductor LC2 is coupled to the first terminal of the winding NC2 in the coupling inductor LTC, and the second end of the common-mode inductor LC2 is coupled to the second terminal of the winding NC2 in the coupling inductor LTC. The first end of the X-capacitor CX is coupled between the live pin L1 and the first end of the common-mode inductor LC1, and the second end of the X-capacitor CX is coupled between the neutral pin N1 and the first end of the common-mode inductor LC2. The first end of the Y-capacitor CY1 is coupled between the live pin L2 and the second end of the common-mode inductor LC1, and the second end of the Y-capacitor CY1 is coupled to an earth ground FG. The first end of the Y-capacitor CY2 is coupled between the neutral pin N2 and the second end of the common-mode inductor LC2, and the second end of the Y-capacitor CY2 is coupled to the earth ground FG.

The AC voltage $V_{AC}$ provided by AC mains may include differential-mode noises or common-mode noises. Differential-mode noises refer to the voltage noises with a frequency range of 10 KHz-30 MHz which exist between the live pin L1 and the neutral pin N1 and do not flow into the earth ground FG. Common-mode noises refer to the voltage noises with a frequency range of 10 KHz-30 MHz which flow from the live pin L1 or the neutral pin N1 into the earth ground FG. In the present invention, the noise suppression circuit 10 may filter the differential-mode noises in the AC voltage $V_{AC}$ using the X-capacitor CX, and filter the common-mode noises in the AC voltage $V_{AC}$ using the Y-capacitors CY1 and CY2. In the present invention, the noise suppression circuit 10 may filter the common-mode noises in the AC voltage $V_{AC}$ further using the common-mode inductors LC1-LC2 whose values are determined based on the bandwidth of the noises. In an embodiment, the inductance of the common-mode inductor LC1 is equal to the inductance of the common-mode inductor LC2 in order to optimize noise filtering. However, the implementation of the noise suppression circuit 10 does not limit the scope of the present invention.

In the embodiment depicted in FIG. 2, the boost active PFC circuit 20 includes a rectifier 12, a power switch Q1, a boost diode DO1, a storage capacitor C1, and a boost inductor L1. The boost active PFC circuit 20 is configured to convert the processed AC voltage $V_{AC}'$ into a pulse DC voltage VO1. In an embodiment of the present invention, the rectifier 12 may be implemented as a bridge rectifier which includes rectifying diodes D1-D4 coupled to the live pin L2 and the neutral pin N2 for receiving the processed AC voltage $V_{AC}'$ and is configured to convert the processed AC voltage $V_{AC}'$ into a DC voltage $V_{IN}$. However, the implementation of the rectifier 12 does not limit the scope of the present invention.

The boost inductor L1 includes a first end coupled to the rectifier 12 for receiving the DC voltage $V_{IN}$ and a second end selectively coupled to a ground level GND1 via the power switch Q1 for storing the energy of the DC voltage $V_{IN}$. The storage capacitor C1 includes a first end coupled to the pulse DC voltage VO1 and a second end coupled to the ground level GND1 for storing the energy of the pulse DC voltage VO1. The boost diode DO1 includes an anode coupled to the second end of the boost inductor L1 and a cathode coupled to the first end of the storage capacitor CO1. The power switch Q1 includes a first end coupled between the second end of the boost inductor LM1 and the anode of the boost diode DO1, a second end coupled to the ground level GND1, and a control end for receiving a control signal GD1. The power switch Q1 is periodically turned on and turned off according to the control signal GD1 so as to allow the boost inductor LM1 to store energy and discharge energy. This way, the input current may vary with the input voltage, thereby increasing the power factor and decreasing current harmonics.

In the boost active APF circuit 20, the boost inductor LM1, the boost diode DO1, the storage capacitor CO1 and the power switch Q1 are operated to provide voltage step-up operation. During the period when the power switch Q1 is turned on by the AC voltage $V_{AC}$ provided by AC mains, the second end of the boost inductor LM1 is coupled to the ground level GND1 so that the boost inductor LM1 may sense the variations in the DC voltage $V_{IN}$ and the resulting time-varying magnetic field induces an electromotive force (voltage) which is stored as magnetic energy in the boost inductor LM1. During the period when the power switch Q1 is turned off by the AC voltage $V_{AC}$ provided by AC mains, the boost inductor LM1 is cut off from the ground level GND1 and its stored magnetic energy is converted into electrical energy, thereby generating large current which charges the storage capacitor CO1 via the boost diode DO1. After the power switch Q1 switches between the turned-on state and turned-off state multiple times, the DC voltage $V_{IN}$ may be boosted to a desired level for supplying the pulse DC voltage VO1.

In the embodiment depicted in FIG. 2, the active clamp flyback converting circuit 30 includes a transformer TR, a power switch Q2, a magnetizing inductor LM2, a storage capacitor CO2, a detecting resistor Rs, and an output diode DO2. The active clamp flyback converting circuit 30 is configured to receive the pulse DC voltage VO1 via its input end and provide the output voltage $V_{OUT}$ via its output end. The transformer TR includes a primary winding (represented by its number of turns NP), a secondary winding (represented by its number of turns NS) and an auxiliary winding (represented by its number of turns NX). The primary winding NP and the auxiliary winding are disposed on the primary side of the transformer TR, and the secondary winding NS is disposed on the secondary side of the transformer TR. The undotted terminal of the primary winding NP is selectively coupled to the ground level GND1 via the power switch Q2, and the dotted terminal of the secondary winding NS is coupled to the ground level GND2. The magnetizing inductor LM2 includes a first end coupled the dotted terminal of the primary winding NP and a second end coupled the undotted terminal of the primary winding NP. The power switch Q2 includes a first end coupled the undotted terminal of the primary winding NP, a second end coupled the ground level GND1, and a control end for receiving a control signal GD2. The output diode DO2 includes an anode coupled to the undotted terminal of the secondary winding NS and a cathode coupled to the output end of the power supply 100 (i.e., the output voltage $V_{OUT}$). The storage capacitor CO2 includes a first end coupled to the cathode of the output diode DO2 and a second end coupled to the ground level GND2 for storing the energy of the output voltage $V_{OUT}$, wherein $I_{OUT}$ represents the output current flowing through the storage capacitor CO2. The detecting resistor Rs includes a first end coupled to the second end of the storage capacitor CO2 and a second end coupled to the ground level GND2 for storing the energy of the output current $I_{OUT}$, thereby providing a corresponding detecting voltage VS.

The pulse DC voltage VO1 outputted by the boost active PFC circuit 20 is the input voltage of the active clamp flyback converting circuit 30. The power switch Q2 is configured to periodically switch between a turned-on state and a turned-off state according to the control signal GD2, thereby allowing the magnetizing inductor LM2 to store energy and discharge energy. The transformer TR is configured to transfer the energy of the pulse DC voltage VO1 stored in its primary winding NP to its secondary winding NS for providing a pulse DC voltage VO2. When the output diode DO2 is forward-biased, the pulse DC voltage VO2 may be transmitted to the output end of the power supply 100, and the storage capacitor CO2 may store the energy stored in the secondary winding NS for supplying the output voltage $V_{OUT}$. When the output diode DO2 is not forward-biased, the power supply path of the power supply 100 is cut off, and the power supply 100 has no output ($V_{OUT}$=0).

In the embodiment depicted in FIG. 2, the voltage-stabilizing feedback compensation circuit 40 includes a compensation capacitor CC, a feedback capacitor CB, a start resistor RP, bandwidth-limiting inductors LX1-LX2, voltage-dividing resistors RO1-RO2, auxiliary switches Q3-Q4, a linear optocoupler PC and a voltage regulator TL. The voltage-dividing resistors RO1 and RO2 are coupled in series between the output voltage $V_{OUT}$ and the ground level GND2, and is configured to provide a reference voltage $V_{REF}$ associated with the output voltage $V_{OUT}$ across the voltage-dividing resistor RO2, wherein $V_{REF}=V_{OUT}*RO2/(RO1+RO2)$. The voltage regulator TL includes a reference terminal R coupled between the voltage-dividing resistors RO1 and RO2 for receiving the reference voltage $V_{REF}$, an anode terminal A coupled to the ground level GND2, and a cathode terminal K coupled to the linear optocoupler PC, wherein $V_{KA}$ represents the voltage established across the cathode terminal K and the anode terminal A. The compensation capacitor CC includes a first end coupled to the cathode terminal K of the voltage regulator TL and a second end coupled to reference terminal R of the voltage regulator TL. The voltage regulator TL is configured to adjust a compensation current $I_c$ flowing from its cathode terminal K to its anode terminal A according to the status of its reference terminal R. More specifically, the voltage regulator TL is configured to compare the reference voltage $V_{REF}$ received via its reference terminal R with a built-in baseline voltage and adjust its gain according to the difference between the reference voltage $V_{REF}$ and the built-in baseline voltage using the compensation capacitor CC coupled between its cathode terminal K and its reference terminal R of the voltage regulator TL. This way, the compensation current $I_c$ flowing through the voltage regulator TL may reflect the value of the reference voltage $V_{REF}$, thereby reflecting the value of the output voltage $V_{OUT}$.

The linear optocoupler PC includes a light-emitting diode 42 and a phototransistor 44 and is configured to perform electrical-optical-electrical conversion between the primary side and the secondary side of the transformer TR. The light-emitting diode 42 is coupled between a first input end and a second input end of the linear optocoupler PC, wherein the anode of the light-emitting diode 42 is coupled to the first end of the storage capacitor CO2 (i.e., the output voltage $V_{OUT}$) via the start resistor RP and the cathode of the light-emitting diode 42 is coupled to the cathode terminal K of the voltage regulator TL. The phototransistor 44 is coupled between a first output end and a second output end of the linear optocoupler PC, wherein the first end of the phototransistor 44 is coupled to the control circuit 50 and the second end of the phototransistor 44 is coupled to the feedback capacitor CB. The feedback capacitor CB includes a first end coupled to the second end of the phototransistor 44 and a second end coupled to the ground level GND1. Since the compensation current $I_c$ flowing through the light-emitting diode 42 is associated with the value of the output voltage $V_{OUT}$, the linear optocoupler PC may detect the variations in the output voltage $V_{OUT}$ using the light-emitting diode 42 on its input side and convert the electrical energy associated with the variations in the output voltage $V_{OUT}$ into optical energy, which is then received by the phototransistor 44 on its output side and converted into a feedback current $I_{FB}$. This way, the feedback capacitor CB may be charged by feedback current $I_{FB}$ for providing the corresponding feedback voltage $V_{FB}$.

The bandwidth-limiting inductor LX1 includes a first end selectively coupled to the first end of the compensation capacitor CC via the auxiliary switch Q3 and a second end coupled to the second end of the compensation capacitor CC. The bandwidth-limiting inductor LX2 includes a first end selectively coupled to the first end of the bandwidth-limiting inductor LX1 via the auxiliary switch Q4 and a second end coupled to the second end of the bandwidth-limiting inductor LX1. The auxiliary switch Q3 includes a first end coupled to the first end of the bandwidth-limiting inductor LX1, a second end coupled to the first end of the compensation capacitor CC, and a control end for receiving a control signal GD3. The auxiliary switch Q4 includes a first end coupled to the first end of the bandwidth-limiting inductor LX2, a second end coupled to the first end of the bandwidth-limiting inductor LX1, and a control end for receiving a control signal GD4.

The present invention can adjust the equivalent capacitance of the voltage-stabilizing feedback compensation loop provided by the voltage-stabilizing feedback compensation circuit 40 by changing the status of the auxiliary switches Q3 and Q4. When the auxiliary switches Q3 and Q4 are both turned off, the bandwidth-limiting inductors LX1 and LX2 are isolated from the voltage-stabilizing feedback compensation loop, and the equivalent capacitance of the voltage-stabilizing feedback compensation loop is thus determined by the compensation capacitor CC alone. When the auxiliary switch Q3 is turned on and the auxiliary switch Q4 is turned off, the bandwidth-limiting inductor LX1 may be coupled in parallel with the compensation capacitor CC, and the equivalent capacitance of the voltage-stabilizing feedback compensation loop is thus determined by the parallel structure of the compensation capacitor CC and the bandwidth-limiting inductor LX1. When the auxiliary switches Q3 and Q4 are both turned on, the bandwidth-limiting inductors LX1 and LX2 may be coupled in parallel with the compensation capacitor CC, and the equivalent capacitance of the voltage-stabilizing feedback compensation loop is thus determined by the parallel structure of the compensation capacitor CC, the bandwidth-limiting inductor LX1 and the bandwidth-limiting inductor LX2.

In the embodiment depicted in FIG. 2, the first end of the bandwidth-limiting inductor LX1 may be coupled to the first end of the winding NC3 in the coupling inductor LTC of the noise suppression circuit 10, and the second end of the bandwidth-limiting inductor LX1 may be coupled to the second end of the winding NC3 in the coupling inductor LTC of the noise suppression circuit 10, the first end of the bandwidth-limiting inductor LX2 may be coupled to the first end of the auxiliary winding NX in the transformer TR of the active clamp flyback converting circuit 30, and the second end of the bandwidth-limiting inductor LX2 may be coupled to the second end of the auxiliary winding NX in the transformer TR of the active clamp flyback converting circuit 30. In another embodiment, the first end of the bandwidth-limiting inductor LX1 may be coupled to the first end of the auxiliary winding NX in the transformer TR of the active clamp flyback converting circuit 30, the second end of the bandwidth-limiting inductor LX1 may be coupled to the second end of the auxiliary winding NX in the transformer TR of the active clamp flyback converting circuit 30, first the end of the bandwidth-limiting inductor LX2 may be coupled to the first end of the winding NC3 in the coupling inductor LTC of the noise suppression circuit 10, and the second end of the bandwidth-limiting inductor LX2 may be coupled to the second end of the winding NC3 in the coupling inductor LTC of the noise suppression circuit 10.

In the embodiment depicted in FIG. 2, the control circuit 50 may be a microcontroller unit (MCU) which includes pins P1-P6. The control circuit 50 is configured to output the control signal GD1 which periodically switches between a first enable level and a first disable level to the control end of the power switch Q1 via its pin P1, output the control signal GD2 which periodically switches between a second enable level and a second disable to the control end of the power switch Q2 via its pin P2, output the control signal GD3 having a third enable level or a third disable to the control end of the auxiliary switch Q3 via its pin P3, and output the control signal GD4 having a fourth enable level or a fourth disable to the control end of the auxiliary switch Q4 via its pin P4. Also, the control circuit 50 is coupled to the active clamp flyback converting circuit 30 via its pin P5 for receiving the detecting voltage VS, and coupled to the voltage-stabilizing feedback compensation circuit 40 via its pin P6 for receiving the feedback voltage $V_{FB}$.

As depicted in FIGS. 1 and 2, when the power supply 100 is connected to AC mains, the noise suppression circuit 10 may filter the noises in the AC voltage $V_{AC}$ supplied by AC mains, thereby providing the processed AC voltage $V_{AC}'$. The rectifier 12 of the boost active PFC circuit 20 may convert the processed AC voltage $V_{AC}'$ into the DC voltage $V_{IN}$. The control circuit 50 is configured to output the control signal GD1 which periodically switches between the first enable level and the first disable level to the control end of the power switch Q1, so that the power switch Q1 may be periodically turned on and turned off correspondingly in order to allow the boost inductor LM1 to periodically store energy and discharge energy, thereby providing the boosted pulse DC voltage VO1 on the primary side of the transformer TR. Next, the control circuit 50 is configured to output the control signal GD2 which periodically switches between the second enable level and the second disable level to the control end of the power switch Q2, so that the power switch Q2 may be periodically turned on and turned off correspondingly in order to periodically transfer the energy stored on the primary side of the transformer TR to the secondary side of the transformer TR, thereby providing the output voltage $V_{OUT}$. Meanwhile, the output current $I_{OUT}$ associated with the output voltage $V_{OUT}$ may flow to the ground level GND2 via the detecting resistor RS, thereby establishing the detecting voltage VS on the detecting resistor Rs. This way, the control circuit 50 may receive the detecting voltage VS via its pin P5, thereby acquiring the instantaneous status of the output current $I_{OUT}$.

As previously stated, the voltage-stabilizing feedback compensation circuit 40 may monitor the instantaneous status of the output voltage $V_{OUT}$ using the voltage-dividing resistors RO1-RO2, the feedback capacitor CC/the bandwidth-limiting inductor LX1/the bandwidth-limiting inductor LX2, the linear optocoupler PC and the voltage regulator TL, thereby providing the corresponding feedback voltage $V_{FB}$. The control circuit 50 may receive the feedback voltage $V_{FB}$ via its pin P6 and compare the feedback voltage $V_{FB}$ with a built-in triangular voltage, thereby adjusting the duty cycle of the control signal GD2 using pulse width modulation (PWM) technique in order to stabilize the output voltage $V_{OUT}$.

In the present invention, the active clamp flyback converting circuit 30 is configured to switch its operational mode based on the instantaneous value of the output current $I_{OUT}$ required for driving a loading device (not shown in FIGS. 1 and 2), and the detecting voltage VS may reflect the instantaneous status of the output current $I_{OUT}$ (VS=$I_{OUT}$*Rs). In the present invention, the control circuit 50 is configured to provide the control signals GD3 and GD4 based on the operational mode of the active clamp flyback converting circuit 30, thereby adjusting the equivalent capacitance of the voltage-stabilizing feedback compensation loop in order to provide suitable voltage-stabilizing feedback compensation ranges for different output loadings. For illustrative purpose, it is assumed that the present active clamp flyback converting circuit 30 have three operational modes: a continuous conduction mode (CCM), a quasi-resonant mode (QRM) and a burst mode (BRM).

Figure 3A:
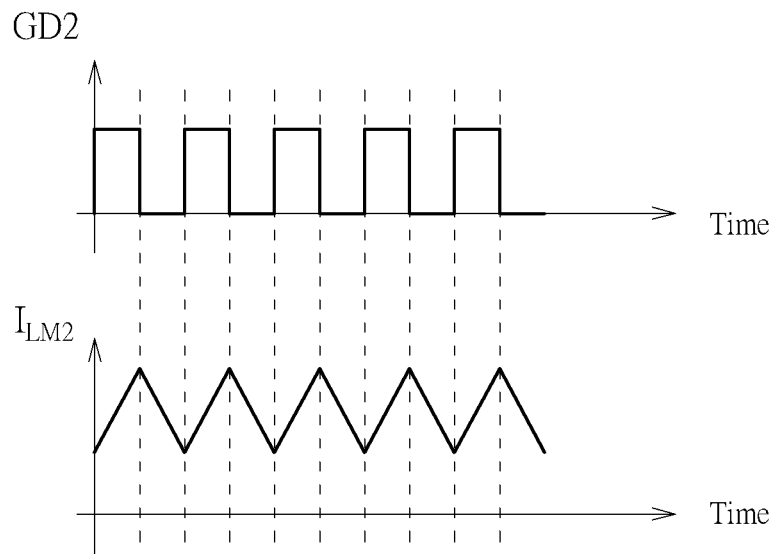
FIG. 3A is a diagram illustrating the waveforms of related signals when the active clamp flyback converting circuit is operating in the continuous conduction mode according to an embodiment of the present invention.

FIG. 3A is a diagram illustrating the waveforms of related signals when the active clamp flyback converting circuit 30 is operating in the continuous conduction mode according to an embodiment of the present invention. In the waveform depicted on the top of FIG. 3A, the horizontal axis represents the control signal GD2 of the power switch Q2, and the horizontal axis represents time. In the waveform depicted on the bottom of FIG. 3A, the horizontal axis represents the current $I_{LM2}$ flowing through the magnetizing inductor LM2, and the horizontal axis represents time. When the instantaneous output loading of the power supply 100 is within 75%-100% of its maximum loading $I_{OMAX}$, the active clamp flyback converting circuit 30 is configured to operate in the continuous conduction mode so as to provide the output voltage $V_{OUT}$ having a larger average power. In the continuous conduction mode, the current $I_{LM2}$ flowing through the magnetizing inductor LM2 remains larger than zero, and the power switch Q2 is operating based on a larger switching frequency within 120K-165 KHz.

Figure 3B:
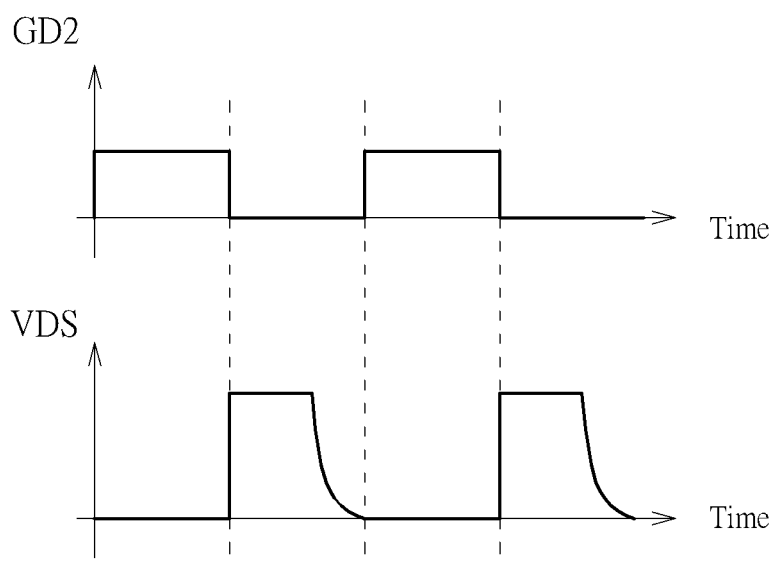
FIG. 3B is a diagram illustrating the waveforms of related signals when the active clamp flyback converting circuit is operating in the quasi-resonant mode according to an embodiment of the present invention.

FIG. 3B is a diagram illustrating the waveforms of related signals when the active clamp flyback converting circuit 30 is operating in the quasi-resonant mode according to an embodiment of the present invention. In the waveform depicted on the top of FIG. 3B, the horizontal axis represents the control signal GD2 of the power switch Q2, and the horizontal axis represents time. In the waveform depicted on the bottom of FIG. 3B, the horizontal axis represents the voltage VDS established across the power switch Q2 (i.e., the voltage difference between the first end and the second end of the power switch Q2), and the horizontal axis represents time. When the instantaneous output loading of the power supply 100 is within 15%-75% of its maximum loading $I_{OMAX}$, the active clamp flyback converting circuit 30 is configured to operate in the quasi-resonant mode so as to improve the overall power conversion efficiency. In the quasi-resonant mode, the power switch Q2 is able to achieve soft-switching at zero-voltage and is operating based on a switching frequency within 65K-100 KHz.

Figure 3C:
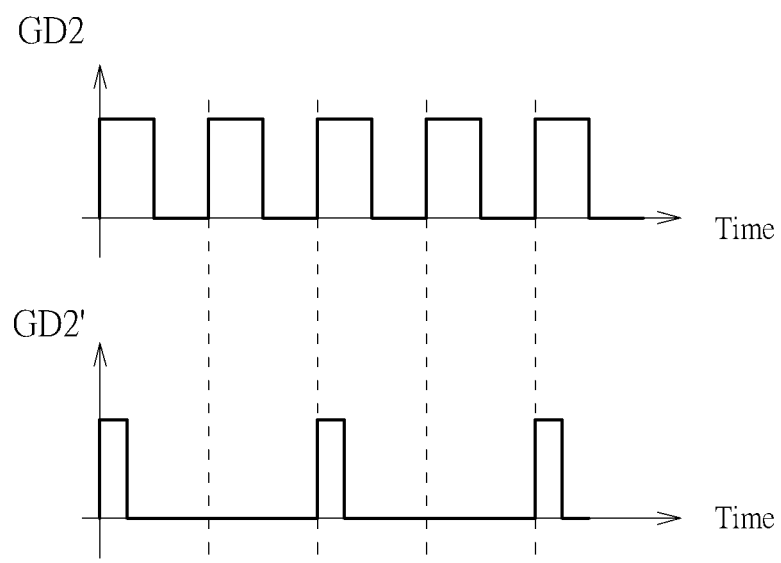
FIG. 3C is a diagram illustrating the waveforms of related signals when the active clamp flyback converting circuit is operating in the burst mode according to an embodiment of the present invention.

FIG. 3C is a diagram illustrating the waveforms of related signals when the active clamp flyback converting circuit 30 is operating in the burst mode according to an embodiment of the present invention. In the waveform depicted on the top of FIG. 3C, the horizontal axis represents the control signal GD2 of the power switch Q2 in the continuous conduction mode, and the horizontal axis represents time. In the waveform depicted on the bottom of FIG. 3C, the horizontal axis represents the control signal GD2' of the power switch Q2 in the burst mode, and the horizontal axis represents time. When the instantaneous output loading of the power supply 100 is lower than 15% of its maximum loading $I_{OMAX}$, the active clamp flyback converting circuit 30 is configured to operate in the burst mode in order to reduce switching loss and satisfy the light-load power efficiency requirement. In the burst mode, the power switch Q2 is operating based on a switching frequency smaller than 15 KKHz, and the switching of the power switch Q2 does not take place during each cycle. Also, the duty cycle of the control signal GD2' in the burst mode is shorter than the duty cycle of the control signal GD2 in the continuous conduction mode.

Figure 4A:
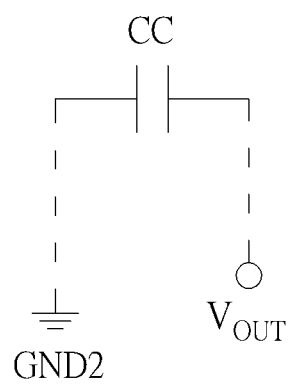
FIGS. 4A-4C are diagrams illustrating the equivalent circuits of the voltage-stabilizing feedback compensation circuit when the power supply is operating in different modes according to embodiments of the present invention.
Figure 4B:
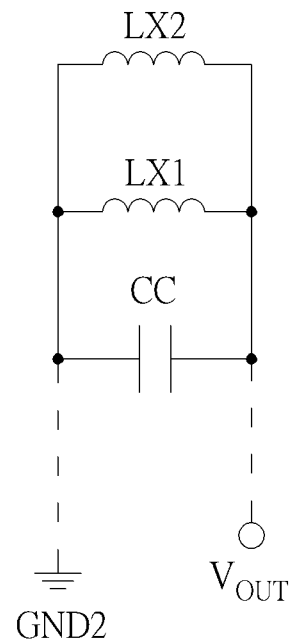
Figure 4C:
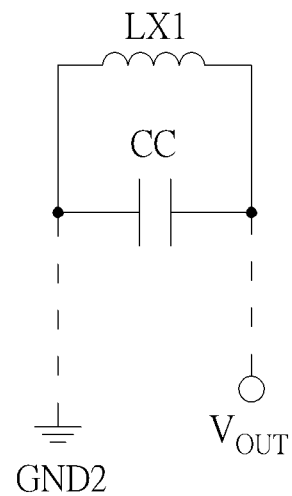
Figure 5:
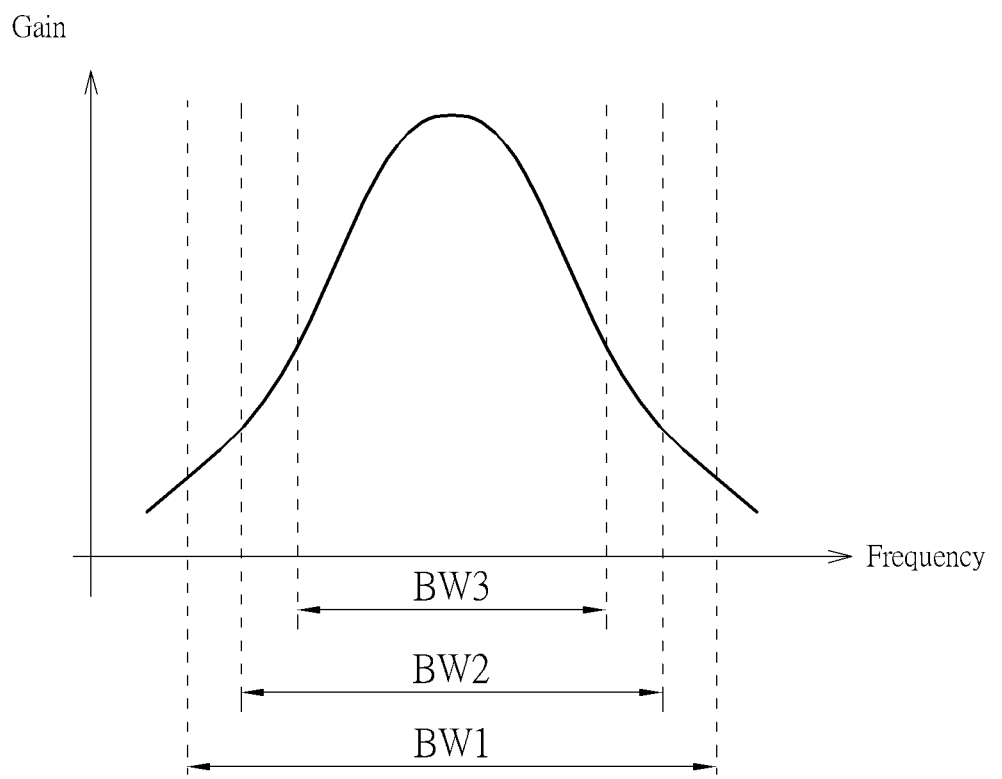
FIG. 5 is a diagram illustrating different voltage-stabilizing feedback compensation ranges when the power supply is operating in different modes according to an embodiment of the present invention.

FIGS. 4A-4C are diagrams illustrating the equivalent circuits of the voltage-stabilizing feedback compensation circuit 40 when the power supply 100 is operating in different modes according to embodiments of the present invention. FIG. 5 is a diagram illustrating different voltage-stabilizing feedback compensation ranges when the power supply 100 is operating in different modes according to an embodiment of the present invention.

When the active clamp flyback converting circuit 30 is operating in the continuous conduction mode, the power switch Q2 is configured to operate based on a larger switching frequency, and a larger voltage-stabilizing feedback compensation range is thus required. When the control circuit 50 determines based on the detecting voltage VS received via its pin P5 that the active clamp flyback converting circuit 30 is currently operating in the continuous conduction mode, the control circuit 50 is configured to output the control signal GD3 having the third disable level via its pin P3 and output the control signal GD4 having the fourth disable level via its pin P4 in order to turning off the auxiliary switches Q3 and Q4. Under such circumstance, the voltage-stabilizing feedback compensation loop provided by the voltage-stabilizing feedback compensation circuit 40 only includes the compensation capacitor CC (as depicted in FIG. 4A). In other words, the equivalent capacitance of the voltage-stabilizing feedback compensation loop may be adjusted to a maximum value for providing the largest voltage-stabilizing feedback compensation range BW1 (as depicted in FIG. 5).

When the active clamp flyback converting circuit 30 is operating in the burst mode, the power switch Q2 is configured to operate based on a smaller switching frequency, and a smaller voltage-stabilizing feedback compensation range is thus required. When the control circuit 50 determines based on the detecting voltage VS received via its pin P5 that the active clamp flyback converting circuit 30 is currently operating in the burst mode, the control circuit 50 is configured to output the control signal GD3 having the third enable level via its pin P3 for turning on the auxiliary switches Q3 and output the control signal GD4 having the fourth disable level via its pin P4 for turning off the auxiliary switch Q4. Under such circumstance, the voltage-stabilizing feedback compensation loop provided by the voltage-stabilizing feedback compensation circuit 40 includes the parallel structure formed by the compensation capacitor CC and the bandwidth-limiting inductor LX1 (as depicted in FIG. 4C). Since the bandwidth-limiting inductor LX1 may compensate the effect of the compensation capacitor CC, the equivalent capacitance of the voltage-stabilizing feedback compensation loop may be adjusted to the minimum value for providing the smallest voltage-stabilizing feedback compensation range BW3 (as depicted in FIG. 5).

When the active clamp flyback converting circuit 30 is operating in the quasi-resonant mode, the power switch 2 is configured to operate based on a medium switching frequency, and a medium voltage-stabilizing feedback compensation range is thus required. When the control circuit 50 determines based on the detecting voltage VS received via its pin P5 that the active clamp flyback converting circuit 30 is currently operating in the quasi-resonant mode, the control circuit 50 is configured to output the control signal GD3 having the third enable level via its pin P3 and output the control signal GD4 having the fourth enable level via its pin P4 for simultaneously turning on the auxiliary switches Q3 and Q4. Under such circumstance, the voltage-stabilizing feedback compensation loop provided by the voltage-stabilizing feedback compensation circuit 40 includes the parallel structure formed by the compensation capacitor CC, the bandwidth-limiting inductor LX1 and the bandwidth-limiting inductor LX2 (as depicted in FIG. 4B). As well-known to those skilled in the art, the overall inductance of the bandwidth-limiting inductors LX1 and LX2 coupled in parallel is smaller than the inductance of each bandwidth-limiting inductor alone, and thus compensates the effect of the compensation capacitor CC with a smaller degree. In other words, the equivalent capacitance of the voltage-stabilizing feedback compensation loop may be adjusted to a medium value for providing a medium voltage-stabilizing feedback compensation range BW2 which is smaller than BW1 and larger than BW3 (as depicted in FIG. 5).

In an embodiment of the present invention, each of the power switches Q1-Q2 and the auxiliary switches Q3-Q4 may be a metal-oxide-semiconductor field-effect transistor (MOSFET), a bipolar junction transistor (BJT), or another device with similar function. For N-type transistors, the enable level is logic 1 and the disable level is logic 0; for P-type transistors, the enable level is logic 0 and the disable level is logic 1. However, the types of the power switches Q1-Q2 and the auxiliary switches Q3-Q4 do not limit the scope of the present invention.

In conclusion, the power supply 100 of the present invention, the boost active PFC circuit 20 may improve the power factor of the AC voltage, the active clamp flyback converting circuit 30 may convert the voltage outputted by the boost active PFC circuit 20 into an output voltage $V_{OUT}$ required for driving a load, and the voltage-stabilizing feedback compensation circuit 40 may perform voltage-stabilizing feedback compensation to the output voltage $V_{OUT}$. The active clamp flyback converting circuit 30 may switch its operational mode based on the instantaneous output loading of the power supply 100, and the control circuit 50 may control the operation of the voltage-stabilizing feedback compensation circuit 40 based on the operational mode of the active clamp flyback converting circuit 30. Therefore, the equivalent capacitance of the voltage-stabilizing feedback compensation loop may be adjusted according to different output loadings for providing different voltage-stabilizing feedback compensation ranges, thereby optimizing power consumption in different operational modes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply with an adaptive adjustable frequency range of voltage compensation mechanism and configured to convert an alternative-current (AC) voltage into an output voltage for supplying power to a loading device, comprising:
   a noise suppression circuit configured to filter noises in the AC voltage for providing a processed AC voltage;
   a boost active power factor correction (PFC) circuit configured to convert the processed AC voltage into a direct-current (DC) voltage and then convert the DC voltage into a first pulse DC voltage;
   an active clamp flyback converting circuit configured to convert the first pulse DC voltage into the output voltage and provide a detecting voltage associated with the output voltage;
   a voltage-stabilizing feedback compensation circuit configured to perform voltage stabilization to the output voltage selectively using a first voltage-stabilizing feedback compensation range or a second voltage-stabilizing feedback compensation range; and
   a control circuit, configured to;
      output a first control signal for controlling an operation of the boost active PFC circuit, wherein a voltage level of the first control signal periodically switches between a first enable level and a first disable level;
      output a second control signal for controlling an operation of the active clamp flyback converting circuit, wherein a voltage level of the second control signal periodically switches between a second enable level and a second disable level;
      determine a current operational mode of the active clamp flyback converting circuit based on the detecting voltage;
      control the voltage-stabilizing feedback compensation circuit to perform voltage-stabilizing feedback compensation to the output voltage using the first voltage-stabilizing feedback compensation range when it is determined based on the detecting voltage that the active clamp flyback converting circuit is operating in a first mode; and
      control the voltage-stabilizing feedback compensation circuit to perform voltage-stabilizing feedback compensation to the output voltage using the second voltage-stabilizing feedback compensation range when it is determined based on the detecting voltage that the active clamp flyback converting circuit is operating in a second mode, wherein:
         a first instantaneous output loading of the power supply when the active clamp flyback converting circuit is operating in the first mode is larger than a second instantaneous output loading of the power supply when the active clamp flyback converting circuit is operating in the second mode; and
         the first voltage-stabilizing feedback compensation range is larger than the second voltage-stabilizing feedback compensation range.

2. The power supply of claim 1, wherein the boost active PFC circuit comprises:

a rectifier configured to convert the processed AC voltage into the DC voltage;
a boost inductor, including:
  a first end coupled to the rectifier for receiving the DC voltage; and
  a second end;
a boost diode, including:
  an anode coupled to the second end of the boost inductor; and
  a cathode coupled to the first pulse DC voltage;
a first storage capacitor for storing energy of the first pulse DC voltage, and including:
  a first end coupled to the first pulse DC voltage; and
  a second end coupled to a first ground level; and
a first power switch, including:
  a first end coupled to the second end of the boost inductor and the anode of the boost diode;
  a second end coupled to the first ground level; and
  a control end coupled to the control circuit for receiving the first control signal.

3. The power supply of claim 1, wherein:
the voltage-stabilizing feedback compensation circuit comprises:
  a voltage regulator including a cathode terminal, an anode terminal and a reference terminal, and configured to:
    receive a reference voltage associated with the output voltage via the reference terminal; and
    adjust a compensation current flowing from the cathode terminal to the anode terminal according to a status of the reference voltage;
  a linear optocoupler configured to detect a variation in the compensation current, convert electrical energy associated with the variation in the compensation current into an optical energy, and convert the optical energy into a feedback current;
  a feedback capacitor configured to provide a feedback voltage to the control circuit by storing energy associated with the feedback current;
  a compensation capacitor for adjusting a gain of the voltage regulator, and including:
    a first end coupled to the cathode terminal of the voltage regulator; and
    a second end coupled to the reference terminal of the voltage regulator;
  a first bandwidth-limiting inductor, including:
    a first end; and
    a second end coupled to the second end of the compensation capacitor;
  a first auxiliary switch, including:
    a first end coupled to the first end of the first bandwidth-limiting inductor;
    a second end coupled to the first end of the compensation capacitor; and
    a control end for receiving a third control signal; and
the control circuit is further configured to:
  output the third control signal having a third disable level for turning off the first auxiliary switch when it is determined based on the detecting voltage that the active clamp flyback converting circuit is operating in the first mode; and
  output the third control signal having a third enable level for turning on the first auxiliary switch so that the first bandwidth-limiting inductor is coupled in parallel with the compensation capacitor when it is determined based on the detecting voltage that the active clamp flyback converting circuit is operating in the second mode.

4. The power supply of claim 3, wherein the active clamp flyback converting circuit comprises:
  a transformer configured to transfer energy of the first pulse DC voltage from a primary side to a secondary side for supplying a second pulse DC voltage, and comprising:
    a primary winding disposed on the primary side and including a first dotted terminal and a first undotted terminal;
    a secondary winding disposed on the secondary side and including a second dotted terminal and a second undotted terminal; and
    an auxiliary winding disposed on the primary side and including a first terminal coupled to the first end of the first bandwidth-limiting inductor and a second terminal coupled to the second end of the first bandwidth-limiting inductor;
  a magnetizing inductor, including:
    a first end coupled to the first dotted terminal; and
    a second end coupled to the first undotted terminal;
  a second power switch, including:
    a first end coupled to the first undotted terminal;
    a second end coupled to a first ground level; and
    a control end for receiving the second control signal;
  a second storage capacitor for storing energy of the second pulse DC voltage, and including a first end and a second end;
  an output diode, including:
    an anode coupled to the second undotted terminal; and
    a cathode coupled to the first end of the second storage capacitor; and
  a detecting resistor coupled between the second end of the second storage capacitor and a second ground level for providing the detecting voltage associated with the output voltage.

5. The power supply of claim 3, wherein the noise suppression circuit comprises:
  a first input end and a second input end for receiving the AC voltage;
  a first output end and a second output end for outputting the processed AC voltage;
  an X-capacitor, including:
    a first end coupled to the first input end; and
    a second end coupled to the second input end;
  a first Y-capacitor, including:
    a first end coupled to the first output end; and
    a second end coupled to an earth ground;
  a second Y-capacitor, including:
    a first end coupled to the second output end; and
    a second end coupled to the earth ground;
  a first common-mode inductor, including:
    a first end coupled to the first input end; and
    a second end coupled to the first output end;
  a second common-mode inductor, including:
    a first end coupled to the second input end; and
    a second end coupled to the second output end;
  a coupling inductor, including:
    a first winding disposed on a first side of the coupling inductor and coupled in parallel with the first common-mode inductor;
    a second winding disposed on a second side of the coupling inductor and coupled in parallel with the second common-mode inductor; and a third winding disposed on the first side of the coupling inductor and coupled in parallel with the first bandwidth-limiting inductor.

6. The power supply of claim 5, wherein:
the noise suppression circuit is configured to filter a differential-mode noise or a common-mode noise in the AC voltage;
the differential-mode noise is a voltage noise between the first input end and the second input end; and
the common-mode noise is a voltage noise transmitted from the first input end or the second input end to the earth ground.

7. The power supply of claim 3, wherein:
the voltage-stabilizing feedback compensation circuit is further configured to perform voltage-stabilizing feedback compensation to the output voltage selectively using a third voltage-stabilizing feedback compensation range, and further comprises:
  a second bandwidth-limiting inductor, including:
    a first end; and
    a second end coupled to the second end of the first bandwidth-limiting inductor; and
  a second auxiliary switch, including:
    a first end coupled to the first end of the second bandwidth-limiting inductor;
    a second end coupled to the first end of the first bandwidth-limiting inductor; and
    a control end for receiving a fourth control signal;
the control circuit is further configured to output the third control signal having the third enable level for turning on the first auxiliary switch and output the fourth control signal having a fourth enable level for turning on the second auxiliary switch when it is determined based on the detecting voltage that the active clamp flyback converting circuit is operating in a third mode, so that the first bandwidth-limiting inductor and the second bandwidth-limiting inductor are coupled in parallel with the compensation capacitor;
a third instantaneous output loading of the power supply when the active clamp flyback converting circuit is operating in the third mode is larger than the second instantaneous output loading and smaller than the first instantaneous output loading; and
the third voltage-stabilizing feedback compensation range is smaller than the first voltage-stabilizing feedback compensation range and larger than the second voltage-stabilizing feedback compensation range.

8. The power supply of claim 7, wherein:
the active clamp flyback converting circuit comprises:
  a transformer configured to transfer energy of the first pulse DC voltage from a primary side to a secondary side for supplying a second pulse DC voltage, and comprising:
    a primary winding disposed on the primary side and including a first dotted terminal and a first undotted terminal;
    a secondary winding disposed on the secondary side and including a second dotted terminal and a second undotted terminal; and
    an auxiliary winding disposed on the primary side and including a first terminal coupled to the first end of the first bandwidth-limiting inductor and a second terminal coupled to the second end of the first bandwidth-limiting inductor;
  a magnetizing inductor, including:
    a first end coupled to the first dotted terminal; and
    a second end coupled to the first undotted terminal;
  a second power switch, including:
    a first end coupled to the first undotted terminal;
    a second end coupled to a first ground level; and
    a control end for receiving the second control signal;
  a second storage capacitor for storing energy of the second pulse DC voltage so as to supply the output voltage, and including a first end and a second end;
  an output diode, including:
    an anode coupled to the second undotted terminal; and
    a cathode coupled to the first end of the second storage capacitor; and
  a detecting resistor coupled between the second end of the second storage capacitor and a second ground level for providing the detecting voltage associated with the output voltage; and
the noise suppression circuit comprises:
  a first input end and a second input end for receiving the AC voltage;
  a first output end and a second output end for outputting the processed AC voltage;
  an X-capacitor, including:
    a first end coupled to the first input end; and
    a second end coupled to the second input end;
  a first Y-capacitor, including:
    a first end coupled to the first output end; and
    a second end coupled to an earth ground;
  a second Y-capacitor, including:
    a first end coupled to the second output end; and
    a second end coupled to the earth ground;
  a first common-mode inductor, including:
    a first end coupled to the first input end; and
    a second end coupled to the first output end;
  a second common-mode inductor, including:
    a first end coupled to the second input end; and
    a second end coupled to the second output end;
  a coupling inductor, including:
    a first winding disposed on a first side of the coupling inductor and coupled in parallel with the first common-mode inductor;
    a second winding disposed on a second side of the coupling inductor and coupled in parallel with the second common-mode inductor; and
    a third winding disposed on the first side of the coupling inductor and coupled in parallel with the second bandwidth-limiting inductor.

9. The power supply of claim 8, wherein:
the noise suppression circuit is configured to filter a differential-mode noise or a common-mode noise in the AC voltage;
the differential-mode noise is a voltage noise between the first input end and the second input end; and
the common-mode noise is a voltage noise transmitted from the first input end or the second input end to the earth ground.

10. The power supply of claim 7, wherein:
the first operation mode is a continuous conduction mode (CCM);
the second operation mode is a burst mode (BRM); and
the third operation mode is a quasi-resonant mode (QRM).

11. The power supply of claim 3, wherein the voltage-stabilizing feedback compensation circuit further comprises:

a first voltage-dividing resistor, including:
  a first end coupled to the output voltage; and
  a second end coupled to the reference voltage; and
a second voltage-dividing resistor, including:
  a first end coupled to the second end of the first voltage-dividing resistor; and
  a second end coupled to the anode terminal of the voltage regulator.

12. The power supply of claim 3, wherein the linear optocoupler comprises:
  a light-emitting diode, including:
    an anode first end coupled to the output voltage; and
    a cathode coupled to the coupled to the cathode terminal of the voltage regulator; and
  a phototransistor, including:
    a first end coupled to the control circuit; and
    a second end coupled to the feedback capacitor.

13. The power supply of claim 12, wherein the voltage-stabilizing feedback compensation circuit further comprises a start resistor which includes:
  a first end coupled to the anode of the light-emitting diode; and
  a second end coupled to the output voltage.

14. The power supply of claim 3, wherein the control circuit is further configured to adjust a duty cycle of the second control signal according to the feedback voltage.

* * * * *